United States Patent
Mankiewicz

(10) Patent No.: US 6,946,496 B2
(45) Date of Patent: Sep. 20, 2005

(54) ARTIFICIAL SOIL

(76) Inventor: Paul S. Mankiewicz, 99 Bay St., City Island, NY (US) 10464

( * ) Notice: Subject to any disclaimer, the term of this patent is extended or adjusted under 35 U.S.C. 154(b) by 176 days.

(21) Appl. No.: 10/668,864

(22) Filed: Sep. 23, 2003

(65) Prior Publication Data

US 2005/0064171 A1 Mar. 24, 2005

(51) Int. Cl.[7] .............................. A01G 31/00; C08J 9/00
(52) U.S. Cl. .............................. 521/50; 521/53; 521/54; 521/55; 47/59 R; 47/58.1 R; 47/58.1 SC; 47/59 S
(58) Field of Search .............................. 521/50, 53, 54, 521/55; 47/59 R, 58.1 R, 58.1 SC, 59 S

(56) References Cited

U.S. PATENT DOCUMENTS 2,891,355 A * 6/1959 Nelson ..................... 47/59 R
RE25,438 E * 8/1963 Nelson ................... 47/58.1 R

OTHER PUBLICATIONS

Paul Mankiewicz PhD., Lightweight Soil for Urban Rooftops, The Gaia Institute, Presentation Made Apr. 2002.

* cited by examiner

Primary Examiner—James J. Seidleck
Assistant Examiner—Irina S. Zeml
(74) Attorney, Agent, or Firm—Howard M. Gitten; Edwards & Angell, LLP

(57) ABSTRACT

An artificial soil includes a plurality of foam plastic fragments. A gel coating is disposed about substantially each of the fragments. Minerals are disposed within the gel coating.

27 Claims, 4 Drawing Sheets

ARTIFICIAL SOIL

BACKGROUND OF THE INVENTION

1. Field of Invention

This invention is directed to a soil, in particular, an artificial soil that is lightweight.

2. Background

In urban environments, roof space provides a triple threat. First, its exposure to the environment and its temperature extremes and moisture conditions provide a high maintenance cost for building owners. Secondly, rooftops produce volumes of urban storm water contributing to non-point pollution and combined sewer overflow. Lastly, the typically black tar surfaces of rooftops contribute to the urban heat island effect and increase the need for power usage and increased use of air conditioning.

To solve this problem, it has been proposed that rooftop urban spaces be used as ecological preserves, by placing soil on the roofs and planting trees, grasses, and other vegetation on the roofs. The use of soil and flora catches and filters water during storms, acts as a leveling thermal barrier between the roof and the ambient atmosphere to cool and filter the atmosphere, increase biodiversity and bird habitat within the city and on large roofs anywhere, while further protecting the roof membrane from damage from ultra violet rays and temperature extremes, including the freeze-thaw cycle, decreasing wear and tear.

However, soil is a complex ecosystem having many characteristics that must be mimicked. Soil serves several functions and has many characteristics, which make it appropriate for supporting plant life. A major fraction of soil is hydrophilic and demonstrates a certain water holding capacity, as well as a capillary action to hold and retain the necessary water, preventing runoff and promoting plant and microbial growth. Furthermore, soil acts as an air and water filter. A root and soil system should also promote microbial film and soil crumb production. Furthermore, soil provides nutrients, such as minerals to plants.

Furthermore, in traditionally urban environments, there is a demand for systems to filter the air, moderate the temperature fluctuations of the environment, and retain and filter water in the environment. One way of doing this, as discussed above, is through the use of herbaceous plants, shrubs and trees in the environment. The flora, in combination with the soil, provides a heat sink and radiator dependent upon water availability and its temperature relative to the environment, capturing storm water, providing shade, and through photosynthesis taking carbon dioxide out of the air and producing oxygen. At the same time, the soil itself not only supports the flora and its function but retains water in its own right and, if sufficiently porous, with high surface area, filters water, prevents unnecessary waste of water through runoff, and filters the air in its own right.

However, much of the available space in urban areas is provided on rooftops or in gardens in the interior of buildings. The use of natural soil on the roof suffers from the disadvantage that it is a dense material, which becomes more dense when saturated with water. Most existing rooftops are not designed to bear loads of over 30 pounds per square foot, a load well below the saturated soil threshold, not including any additional flora planted therein.

Hydroponic gardens, which do away with soil, have been developed to promote flora use in urban settings. However, they suffer from the disadvantage that they do not prevent runoff, do not adequately support a sufficient biomass of flora, and do not perform the other functions of soil, namely filtration of water and air.

Artificial soils are known in the art as known from the lightweight soil developed by the Applicant in 2002. Applicant mixed shredded expanded polystyrene with composted organics. However, the proposed lightweight soil was not hydrophilic, nor did it provide many of the other necessary characteristics of pore size, or structural integrity, to truly mimic the functionality of soil.

Accordingly, lightweight soil capable of mimicking the attributes of a true soil including the hydrophilic and filtering characteristics of the soil is desired.

SUMMARY OF THE INVENTION

An artificial soil includes fragments of foam plastic. A coating of colloidal gel is disposed on the fragments of foam plastic to form a matrix. Minerals are disposed within the matrix.

In one embodiment, the expanded foam fragments are formed as fibers, the minerals are disposed, at least in part, within the colloidal gel coating and fibers of other organic and inorganic materials are disposed between the fibers of the foam plastic.

In another embodiment, the mixture of foam plastic fragments, gel and minerals form a matrix. The matrix forms a first layer of a soil system. A layer of humus is disposed on the soil matrix. A third, top surface, may be formed of undecomposed and partly decomposed surface materials.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

The artificial soil described below is a result of structuring matrix potential, capillary scale and water potential to mimic the function of natural soil to meet plant and microbial growth requirements. Water holding capacity is achieved at three different scales; namely at a molecular scale, a macromolecular/soil and soil systems scale. At the molecular scale, fragments or particles of plastics are coated on the surface in order to provide a hydrophilic character to the artificial soil. At the macromolecular scale, fibers of humic or other type of material are distributed throughout a created soil column or matrix, between and amongst, the fragment particle matrix. The actual particles themselves are scaled to hold water and air in the pores formed between the particles, sized to meet different needs, created in the interparticle space through geometric close packing. By varying properties at each of these scales, soils with different aeration, water holding and resistance to water loss characteristics can be provided. Lastly, on a system wide scale, the depth of the soil horizon connects an organic mulch layer with the artificial matrix surface layers with the geophysical and geochemical interface below over distances ranging from a few centimeters to more than a meter.

Figure 1:
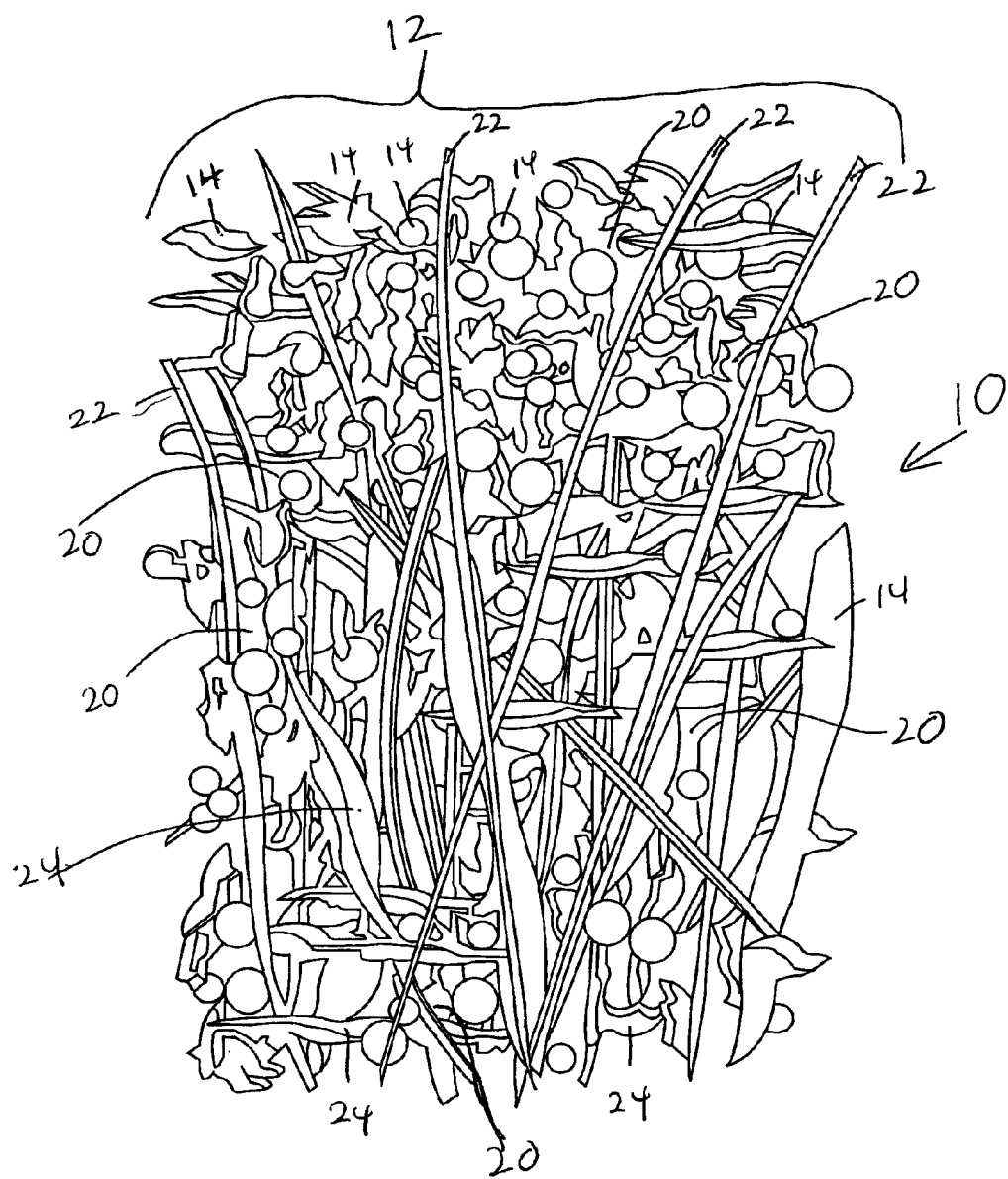
FIG. 1 is a sectional view of an artificial soil constructed in accordance with the invention.
Figure 2:
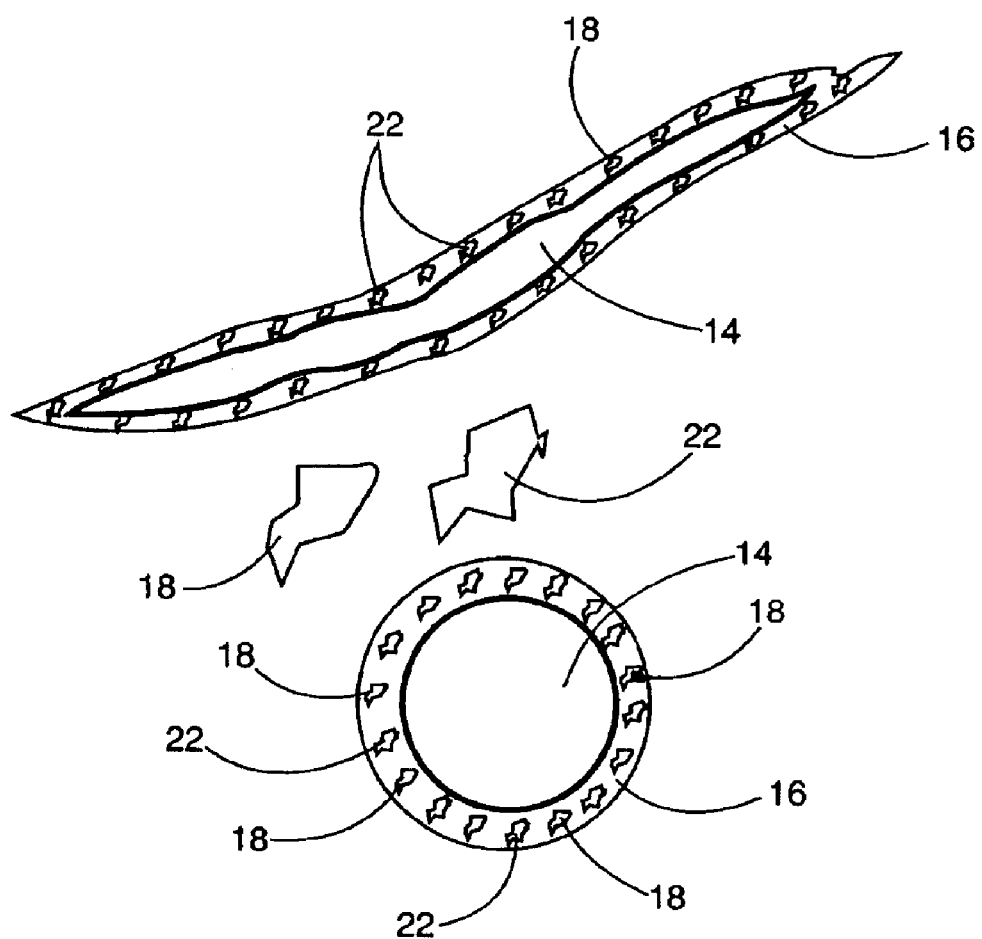
FIG. 2 is an enlarged sectional view of coated fragments in accordance with the invention.

Reference is made to FIGS. 1 and 2 in which a soil system, generally indicated as 10, constructed in accordance with the invention, is provided. Fragments 14 of a lightweight foam plastic have a colloidal gel coating 16 (FIG. 2) thereon. The fragments may be in any shape and need not be symmetrical. However, in a preferred embodiment, the fragments are combinations of asymmetrical, elongated fibers in which the minimum width is approximately 1 to 2 millimeters and the length can be from about 1 to 30 centimeters. Furthermore, not of each of the sizes of each of the fibers need be identical and a combination of fine to coarse grain "fiber cuts" of the foam plastic material is preferred, ranging from 1 to 2 millimeters thick, 1 to 5 millimeters wide and 100 to 300 millimeters long. In the preferred embodiment, to provide a structure which allows for a combination of long tensile elements plus short rounded to angular compressive elements, a variety of sized and shaped fragments may be used. As a result, as will be discussed below, a variety of pore spacings is provided within a matrix 12 of soil 10.

The foam plastic is fragmented in size by either milling, shredding or shearing using tools such as hammer mills, paper shredders, shear plates or the like to achieve specific shape and size distributions, as well as impacting surface textures. As will be discussed below, the spacing between the constituent elements of soil 10 form pores 20. Because pore scale and geometry depends on a particular size and shape, and because the interpore packing strongly affects final pore size, both the original particle size distribution and the order and method of mixing and priming determines the outcome of these processes in terms of porosity and pore geometry.

In a preferred embodiment, the foam plastic is an expandable polystyrene. In particular, it is post consumer, i.e. recycled, expanded polystyrene, such as from "peanuts" cups, plates, packaging and the like. However, unexpanded plastics may also be used.

Standard soils are composed of sands, silts and clays with varying quantities of organics. The foam plastic replaces the structure of the mineral sands and silts. However, it is the addition of gel 16 which achieves the adhesion with water and transforms the hydrophobic plastic into a hydrophilic surface. Gum Arabic and other arabinogalactans and hydroxyproline proteins may be used where their specific properties are needed to support specific community growth and development features and/or air or water filtration or biofiltration. Therefore, the colloidal contents of natural soil is emulated and imitated in the growth medium through coating 16 about fragments 14. In a preferred embodiment, the gel coating may be made of one or more of agar, pectinate, gelatin and collagen. The coated fragments 14 are arranged and spaced so that soil 10 is formed as a matrix 12.

Minerals 18 are disposed within coatings 16 in matrix 12. In a preferred embodiment, clays are used within artificial soil 10 as the source of minerals 18, as well as to provide adhesive and cohesive forces for adhering to the coated surfaces of fragment 14. Minerals 18 also add biogeochemical surface area and reactivity for pollutant removal. The macronutrients for plants and microbial growth required in soil may be derived from the calcium, magnesium, potassium and other minerals associated with clay micelles, or mixed separately as macro and micronutrient amendments to the gel.

In another embodiment, recycled waste material such as the exoskeletons (shells) of lobsters, oysters, claims and other invertebrates, as well as bones (in powdered or granular form), are mixed into matrix 12 of artificial soil 10, as well as into gel coating 14. These organic mineral sources may be added along with the mineral sources discussed above such as potash and clays to optimize soil 10 as a medium for plant growth and development. By utilizing exoskeletons and bones, which are most commonly waste material from foodstuffs, the artificial soil again makes use of recycled materials. Furthermore, as discussed below, minerals 18 may also be used for pH regulation in soil matrix 12 to affect the properties of the soil medium. In the preferred embodiment, minerals 18 are ground into a powder to facilitate suspension in gel layers 16, as well as to increase surface area. However, it is also contemplated that excessive amounts of minerals 18, or composted minerals 18 too large to be suspended by gels 16 may also be used as part of matrix 12.

The scalar geometric features as well as the use of the colloidal gel with specific minerals as discussed above, yields several advantages.

In one embodiment, by way of example, soil matrix 12 is more than half fragments 14 by volume. Minerals 18, including the composted organics, make up another tenth to a fifth of volume. The relative volumes can be changed depending upon the higher or lower concentrations of minerals or other organics required for a specific natural growth and development. The remainder of the volume is made up from gel coatings 16 and pores 20. The bulk density of soil matrix 12 is between nine pounds and twenty-five pounds per cubic foot, with all capillary water pores 20 within matrix 12 holding water.

Cationic exchange varies, depending on the mix of the component ingredients, fragment 14, gel 16 and minerals 18. The exchange can be engineered to be as high as 50 cmole/kg or higher, depending upon the pH, clay, mineral, and compost content.

As discussed above, soil has essential properties which are mimicked by the above-construction of artificial soil 10 which can be affected by the size and shape of fragment 14, the specific contents of the gel coating 16 including the nature of the minerals 18 disposed about and therein, as well as the spacing (pore size) between respective coated fragments 14.

As discussed above, an important property to be mimicked is the ability to retain water within matrix 12 while at the same time allowing water to travel therethrough to allow runoff at over saturation and travel of water through matrix 12 to the root structure of the plants living therein. At the same time, oxygen retention and flow through matrix 12 is important to support various microbial film growth and development within matrix 12.

The scale of the set of pores 20 (capillary spaces) between and amongst fragments 14 sets the stage for water holding volume. Large pores 20, providing capillary spaces, hold volumes of water proportional to the cube of their radius ($R^3$). As a result, large pores 20 hold more water than smaller pores 20 because, as the radius increases, water holding capacity increases by the third power.

In contrast, resistance to water loss, i.e., the rate at which water flows between the pores and out of a geometric area, is inversely proportional to the radius of the pore by a power of 5 or $1/R^5$. Accordingly, smaller pores 20 have much more resistance to water loss than larger pores 20 and a tight weave of fragment 14 would have a very high resistance to water loss, but because of the absence of large pore space, water holding capacity would be greatly limited. Again, on the other hand, a more open weave of fragment 14 would leave a large water holding capacity but would lose water quickly since its capacity to resist water loss would be relatively small compared to the tight weave, resistance being inversely proportional to the radius raised to the fifth power.

Because air is also a fluid, the flow of air through soil is proportional to the radius of a given pore 20 by a factor of the fourth power ($R^4$). Accordingly, as pore size increases from, for example, 1 millimeter to 10 millimeters, air flow increases ten thousand fold given the same pressure. Therefore, for soil to act as a filtration device, filtration and passage of air through the soil is a function of the radius of the air pore sets, i.e., the distance that a nutrient or pollutant in the air must move by diffusion between the water and the reactive interface of roots, fungi, bacteria, humus and/or clay of soil matrix 12.

Diffusion of air is also a function of the concentration gradient of the nutrient or chemical flowing through the air pores 20. Considering a one-dimensional gradient, flow along the radius of the pore into soil matrix 12, is thus in fact a function of concentration, regulated by reactive surfaces within the soil, and in turn controlled by the rate of diffusion from the air column to the reactive interface of the air per wall formed within matrix 12. The shorter the radius, the more rapid the diffusion. At the same time, however, the smaller the radius, the greater the resistance and the more energy required to move air through pore space 20.

The rate of removal thus depends on (the amount of material within the air column)×(the coefficient of diffusion)×(the time that a given pulse of air is within soil matrix 12). Accordingly, air filtration by soil matrix 12 is an interaction between the area of reactive surface, the time air is within the soil column and the quantity of air and the material to be removed from the air within the soil column for a given soil volume. Long residence time can scrub the majority of the material from the air, but the total quantities will be a function of throughput which is here low. High throughput increases the quantity of air moving through the soil, but decreases dwell time, decreasing removal rates which depend on interaction between soil and air column. Optimization is thus dependent on residence time, such that each pulse of air spends sufficient time within the pores 20 of soil matrix 12. In a preferred embodiment, the mean or average radius of the pore is between about 0.1 mm and about 10 mm.

In one embodiment, organic materials, preferably urban and suburban waste stream materials, can be mined to create humus or other organic compost 22 which can be mixed within matrix 12 both in gel coating 16 and within the pores of matrix 12. Peat or compost can be used, and may be made from such materials as shredded leaves, paper, wood fibers and the like. The use of cellulosic materials increases the holding capacity and resistance to water loss, creates sinks within the soil for nitrogen and other pollutants or chemicals of concern, and adds a carbon source to support bacterial and/or fungal growth within soil 10. Fibers could be added separately or coated with gels, generally added separately, since they are 'natural' components of soil, with their own functional contributions in water holding and in supporting microbial consortia.

The pH of the soil is regulated by acids, bases and buffers occurring in natural soils. pH characteristics are simulated in soil matrix 12 by the addition of the organic additives 22 (such as humus, mulch or the like) and mineral additives 18. By balancing quantities of the clays, limey materials, wood ash and phosphates with humus as well as products of the naturally occurring below ground plant growth and development, the pH can be regulated. By adding gel coating 16 with varying quantities of basic and acidic components of minerals 18 and compost particles 22, aspects of pH regulation facilitated by moisture and microbial activity can be enhanced. Thus specific ratios of starting materials can be used as known in the art to constrain the final pH outcome of a soil mixture, including the pH and elements used in creating the compost used as the organic component 22 of the mix as well as compounds added to gel coating 16 or other materials used to treat the foam plastic fragment 14 to increase hydrophilic qualities.

By way of example, powdered lime, cement, and/or bone meal may be used to introduce minerals 18 in lightweight soil 10, while at the same time controlling pH and phosphorous levels. As discussed above, calcium carbonate and/or calcium phosphate from the exoskeletons of crustaceans may be dissolved and used to make part of the gel coating 16 or free minerals 18 adding a source of phosphorous, calcium and some trace metals, making it possible to grow calciphiles, plants requiring high pH for growth and development, and providing surfaces for adsorption of iron, lead and other metals. These coatings allow for irregular and long shreds of fragment 14 from foam plastics, as well as shreds and fibers 24 of glass and other inorganic fibers to give matrix 12 additional structure facilitating creation of layers or blocks which can then be used in modular roofing and as floating or attached habitat in aquatic or estuarine environments. As discussed above, shells, lime, and bone meal are known in the art to create high pH regulators. However, acidic compost made from oak leaf and/or spruces, firs, and/or pines or waste materials such as citric fruit rinds can be used to set pH lower. Added together in the proper proportions, these basic and acidic regulators are used to set pH at ranges suitable for given plants, species or communities and, or for the removal of specific materials or pollutants from a water or air waste stream.

Similarly, by mixing the appropriate minerals 18 into matrix 12 including into gel coating 16, nutrient and mineral levels and ion exchange capacity can be tailored to suit particular purposes. So, by way of example, soil matrix 12 can be designed specifically for plants or microbes with high potassium, phosphorous or specific trace metal needs merely by increasing the relative amount of the organic mineral particles 18 disposed within matrix 12. In a similar manner, where precipitation is known to add specific ranges of nitrate and sulfate, quantities of magnesium and calcium can be utilized as mineral particles 18 and impregnated in and about gel coating 16 or impregnated directly into fragments 14 to allow for time released buffering capacity of the soil against acid rain inputs for a specific number of growing seasons, based on expected rainfall quantities and nitrate and sulfate concentrations and diffusion rates.

Figure 3:
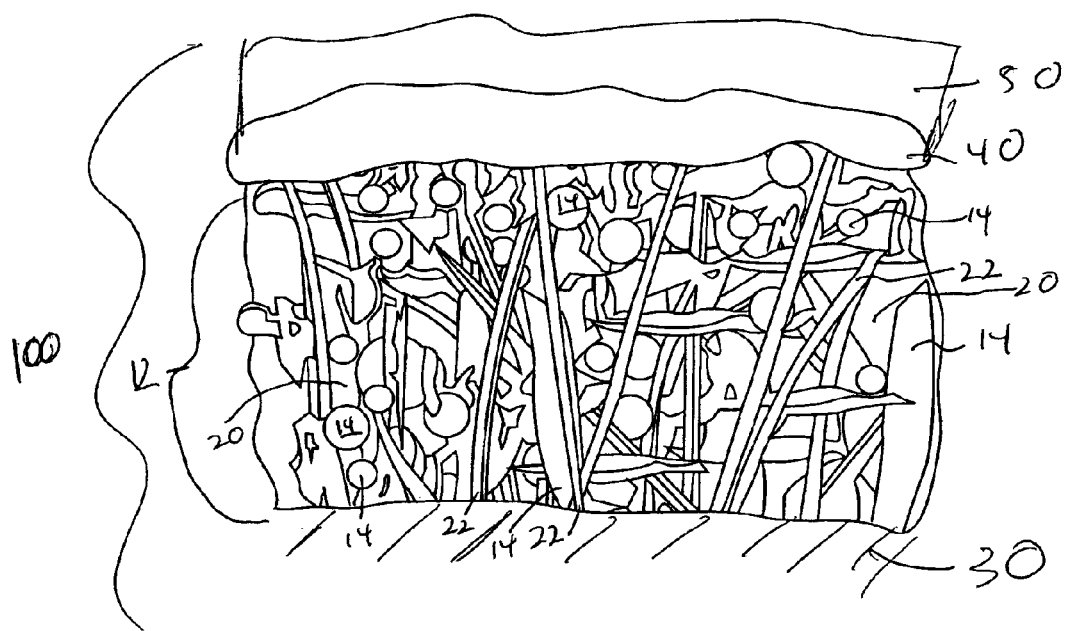
FIG. 3 is a sectional view of a soil system constructed in accordance with the invention.

Reference is now made to FIG. 3. The soil system 100 is formed of soil matrix 12, which rests on a base 30. Base 30 is any solid platform sufficient to hold the weight of at least soil matrix 12 fully saturated with water. In an urban setting, base 30 would be the rooftop of a building described above. In a preferred embodiment, base 30 may include matting, as known in the art, to allow water drainoff.

To avoid soil erosion, and to better mimic the soil horizons of natural soil, artificial soil system 100 includes soil matrix 12 having a top layer 40 of organic material disposed thereon. In a first embodiment, top layer 40 is a top dressing layer made of humus, mulch, jute weave, or the like. The use of humus and mulch mimics the naturally occurring soil structure in which organic matters falls on the surface of the organic soil. Roots extend their carbon-based structure centimeters to meters below surface 40 and the flow of water connects the upper horizons of the soil formed by layer 40 to the lower levels of matrix 12 as a result of the force of gravity. In another embodiment, an uppermost layer 50 may be formed of undecomposed and partly decomposed surface material and sits on top of the naturally occurring humus accumulation where minerals are mobilized and are taken up by the plants. With the artificial soil, the undecomposed and partly decomposed surface material will occur naturally from the plant life and biodiversity growing in and attracted to soil 10. The carbon layer will be provided by the organic compost particles 22 and/or humus layer 40.

Furthermore, the humic particles and inorganic fibers 24 form with coated fragments 14 to create a level of organization within matrix 12 which connects the molecular particle and soil horizon levels in terms of water holding and conduction between and among fibers formed from fragment 14, as well as adding frictional interactions between the layers within matrix 12 and/or between soil matrix 12 and topsoil layer 40 to increase the structural integrity of the material for use on rooftops, by way of example, and to maintain the interparticle spacing and positioning to maintain the spacing of pores 20 to sustain filtration capacities. Furthermore, the use of an organic top layer 40 such as that made from compost or humus as an upper surface to soil system 10, produces an area available for enhanced root growth, mineral mobilization, additional water holding capacity and an environment conducive to invertebrate activity, such as that found in natural soils.

The mixing of compost and mulch particles 22 within matrix 12 also provides the advantage of encouraging the growth and maintenance of microbial films. In natural soils, a cubic centimeter of natural soil may contain a million to a billion microbes. This is particularly true in the top, humus rich soil layers. Microbes are involved with most every aspect of plant metabolism and soil biogeochemistry, and the microbial films which develop in soils mediate the exchange and uptake of minerals, both mobilizing and regulating the flow of mineral ions. Therefore, the mechanisms involved could modify the concentration of oxygen and free electrons, thereby affecting the solubilities and availabilities of minerals at varying oxidation and reduction states. In microbial films, surface organisms use oxygen, while deeper within the film, using other electron acceptors, regulating the Eh or electron availability, facilitating anaerobic processes modifying mineral availability as well as pollutant removal capacity. The use of gel coating 16 facilitates the colonization of fragments 14 by microbial films by providing moist, mineral rich conditions. However, because gels inhibit the free movement of oxygen and the effects of microbial films are often dependent on the movement of oxygen, gels 16 can in effect be toxic to certain microbial species in a microbial film, while facilitating the growth and development of others. However, the addition of the finished compost and mulch particles 22 within matrix 12 act to inoculate the mix, to facilitate the development of the microbial films, which then act to regulate soil pH and the availability of water and minerals in soil solution.

Soils are also subject to erosion. In nature, soils resist erosion through gravity, soil particle interaction with plants and cobionts, and the water adhesion of the films of water distributed between particles, which connect and bind soil particles together through surface tension of water and capillary adhesion between the particles. Furthermore, the upper portions of the plants growing from the soil resist wind forces creating a boundary layer over soil greatly diminishing wind velocities at the soil surface. Below ground the root structure literally binds volumes of soil together with a three-dimensional network. In nature, soils generally also bind together in a three-dimensional matrix with substantial resistance to wind and water erosion.

It should be also noted that when top layer 40 is formed it further protects against erosion by forming a wettable erosion blanket when formed with pliable materials. Erosion blankets may also be used to further protect system 10.

In another embodiment, fibers 24 having high surface to volume ratio may be added to matrix 12 to increase the surface energies in the capillary adhesion of matrix 12, while also optimizing capillary water holding capacities. This is accomplished by adding shredded, flattened fibers 24 dispersed within matrix 12. The flattened fibers may also be made of foam plastic materials. Generally, other fibers made from shredding and/or grinding cellulose, coconut, wood, glass or the like are also added to increase the surface energies and the capillary adhesion.

Figure 4:
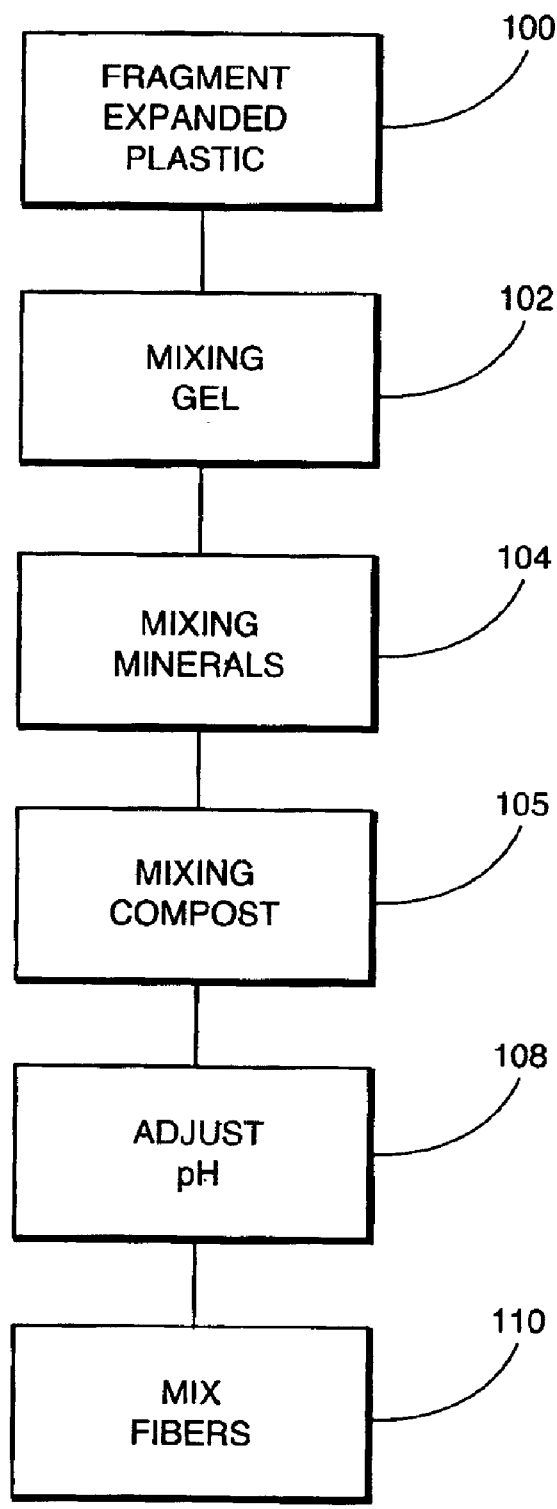
FIG. 4 is a flow chart of the steps for manufacture of the artificial soil.

Reference is now made to FIG. 4 in which a method for creating artificial soil matrix 12 is provided. In a first step 100, foam plastic is fragmented. Fragmentation can be done by milling, shredding, cutting, shearing or the like. The fragments can be of any shape, but preferably are fibrous, i.e. having a greater length or thickness to develop the matrix 12. The grinding and shredding methods and the specific kinds of materials fed into the fragmenting machinery determine the particle output in terms of length to width ratios of the output as well as the overall geometric ratio of the particles.

In a next step 102, the fragmented particles 14 of foam plastic are now mixed with the other constituent ingredients such as gel 16. The mixing and method may have a significant impact on the porosity. Furthermore, mixing in a dry environment or with water can increase compaction and close packing, diminishing pore volume. Moving and delivery of the material dry or in a water slurry through a vacuum apparatus into a closed container can also decrease internal pore volume, while on the other hand, blowing the dry or wet slurry into large volume containers can be used to increase pore volume. Therefore, in step 102, in one embodiment of the invention, the gel coating 16 is mixed either with a dry fragment 14 of expanded plastic or a wet slurry of fragment 14.

Mixing may be accomplished in standard mixers as known in the art such as standard concrete mixers of any scale and/or large scale baking mixers, or technology used in stirring paints and other viscous media. By way of example, standard augers may be used where small pore space is desirable, and a shaftless auger, such as that described in U.S. Pat. No. 5,948,674 issued to Applicant may be used to mix the materials.

Either simultaneously therewith or in a next step, powdered or composted minerals 18 such as calcium, phosphorous and the like as discussed above are mixed in a step 104. It should be noted that minerals 18 may be mixed with the gel prior to mixing of the gel with the fragments 14 of expanded plastic. It should also be noted that from here on in the next steps, mixing may be performed either in sequential order as described or simultaneously with the mixing of the gel, or in interchangeable order such that for example in the next step 106 when compost and other cellulose products are mixed in, this could in fact be done ahead of mixing minerals in step 104 and, although not preferred, ahead of the mixing in of gel in step 102. Therefore, it is mixing of the ingredients themselves and not the particular order, which is of import to the formation of matrix 12.

As discussed above, depending on the end use of soil matrix 12, pH modifiers, Eh modifiers, buffers and capacitors may also be used in the soil. Therefore, in a step 108 powdered lime, cement, and/or bonemeal may be added to adjust the pH higher. Similarly, in step 108, oak leaf and spruces, firs, and pines, sulfate, or other non-toxic acidic materials may be used to set the pH lower on the scale for an acidic zone. These materials are also mixed utilizing the mixer as discussed above. This step may also include the mixing in of organic materials 22, which may be mixed in at sizes to exist as individual particles in matrix 12 and/or as suspended in gel coating 16 about fragments 14.

Lastly, to provide structural integrity for soil matrix 12, in particular, for use in connection with a soil system 10, long fibrous shreds of foam plastic, other inorganic fibers 24 such as glass may be used to create layers or blocks and to provide structural integrity to soil horizon layers.

As a result of the novel soil matrix construct and method of manufacture, it is possible to design and engineer a soil to meet specific needs to support a wide variety of plant life. This can be done by affecting the porosity of the soil, which in turn affects the ability to hold and retain air and water. It also can be done by changing the pH and Eh of the soil, which can be done by providing additives. Another unique aspect of soil system 10 is that the system also recycles and reuses otherwise waste materials such as post consumer expanded plastic such as polystyrene, or post consumer food stuffs such as shells, bones, fruit and the like. As a result, the artificial soil closes the loop in the industrial cycle of production, consumption, and landfill by producing an economically and aesthetically attractive vegetated rooftops and interior areas. Such waste materials include expanded polystyrene and other lightweight foam plastics, plus organic waste which can be composted to produce humus, cellulose and leaf mulches, as well as wood and glass fibers to increase the structural integrity of the soil. Most importantly, all of these materials can be used to provide a soil, which is light in weight, making it adaptable for use on rooftops and interior supporting structures not usually capable of supporting the full weight of a natural soil with plant life. In addition, pore geometry and volume requirements may be varied to achieve water holding and aeration levels for self-regulating and self-organizing plant growth and/or filtration processes.

Other characteristics may be manipulated and enhanced to serve a number of subsidiary purposes as described above. These include microbial film and soil crumb development. By way of example, tilth, a given characteristic in naturally occurring soils, which may change depending on moisture content, can here be used to set a specific design goal for plant performance. Defined in terms of aggregate formation and stability, bulk density, moisture content, aeration, rates of infiltration and drainage, and capillary water capacity are all components of tilth, and these separately and together are used as design parameters for integrating the soil elements in a final product for a given end use of artificial soil matrix 12. Specifically, end point capillary behavior of the soil matrix is used to set the scale of the grind of the foam plastics. These scalar geometric features are set to optimize the water holding capacities of capillary films within a soil column between 5 and 50 centimeters deep. The scale of the grind of soil 10 can also be used to determine quantity of air flow, which would be important in certain applications such as the use of a rooftop planting as an air filter for interior space within the building. As discussed above, microbial film development on the soil can be achieved by recycling water containing nutrients over ground, sized plastic particles to enhance microbial film development and create a store of minerals including P, K, Mg, Ca, and trace metals. As discussed above, use of specially formulated composts from acidic to basic can be used in the lightweight soil mix such that the end product can be suited to specific plant community needs, from chalk and limestone requiring plant species and communities to acid loving meadow, forest floor, and even wetland plants.

The ultimate benefit is that all of these properties can be designed in a soil which is engineered to weigh between about nine and twenty-five pounds per cubic foot, under saturated conditions. Additionally, while the lightweight matrix soil 12 is composed of hydrophobic or water repelling materials including the foam plastics, the novel methods described above have been developed to coat these materials with microbial films and colloidal surfaces such as gel coating 16 to mimic the hydrophilic properties of natural soil. Furthermore, the shredding, grinding and shearing of the foam plastic increases the surface area of the sum of fragment 16 as opposed to the surface area of the starting material. Additionally, using these materials in trickling filter recycle column for microbial film development and/or coating them with gel coating 16 and humus connecting particles such as cellulose particles 22 with long fibers 24 to increase coherent strength and resistance to erosion and disturbance provides a lightweight soil which mimics the life supporting properties and filtration properties of natural soil. These processes and treatments together move the system into the hydrophilic range of behavior. With a hydrophilic surface, artificial soil matrix 12 becomes more sponge-like and capable of applying negative pressures on available water, i.e., pulling water into the pore spaces of the soil matrix 12, and resisting the loss of water to surroundings, thereby promoting plant life.

Thus while there have been shown and described and pointed out novel features of the present invention as applied to preferred embodiments thereof, it will be understood that various omissions and substitutions and changes in the form and details of the disclosed invention may be made by those skilled in the art without departing from the spirit and scope of the invention. It is the intention, therefore, to be limited only as indicated by the scope of the claims appended hereto.

It is also to be understood that the following claims are intended to cover all the generic and specific features of the invention herein described and all statements of the scope of the invention which as a matter of language might be said to fall therebetween.

What is claimed is:

1. A soil comprising:
   a plurality of foam plastic fragments;
   a gel coating disposed about each of said fragments; and
   minerals disposed within said gel coating, wherein
   said foamed plastic fragments include expanded polystyrene; and
   wherein said gel coating includes at least one of agar, pectin, gelatin, collagen, and mixtures thereof.

2. The soil of claim 1, wherein said fragments are formed by one of milling, shearing and grinding.

3. The soil of claim 1, further comprising cellulose fibers disposed between said fragments.

4. The soil of claim 1, wherein said minerals include at least one of calcium carbonate and calcium phosphate.

5. The soil of claim 1, wherein said fragments are formed from recycled foam plastics.

6. The soil of claim 1, wherein said minerals are formed from recycled materials.

7. The soil of claim 6, wherein said recycled materials are exoskeletons of invertebrates.

8. The soil of claim 1, wherein said fragments, gel coatings, and minerals form a soil matrix, said soil further comprising a top layer disposed upon said soil matrix, said top layer being formed of organic materials.

9. The soil of claim 1, further comprising inorganic fibers disposed between said fragments.

10. The soil of claim 1, wherein said fragments are formed as fibers.

11. A soil system comprising:
an artificial soil matrix,
said soil matrix including a plurality of foam plastic fragments,
a gel coating disposed about each of said fragments, and
minerals disposed in said gel coating; and
a top soil layer disposed above said artificial soil matrix,
wherein said foamed plastic fragments include expanded polystyrene; and
wherein said gel coating includes at least one of agar, pectin, gelatin, collagen and mixtures thereof.

12. The soil system of claim 11, wherein said top soil is formed of organic materials.

13. The soil system of claim 11, wherein said organic material is humus.

14. The soil system of claim 11, wherein said matrix further comprises compost disposed within said matrix.

15. A method for creating an artificial soil comprising the steps of:
fragmenting foam plastic to obtain a plurality of fragments of said foam plastic;
mixing said fragments with a gel to coat said; and
mixing minerals with said gel, wherein said foamed plastic fragments include expanded polystyrene; and
wherein said gel coating includes at least one of agar, pectin, gelatin, collagen and mixtures thereof.

16. The method of claim 15, wherein said fragmenting is done by one of grinding, shearing, and milling.

17. The method of claim 15, wherein said mineral is mixed with said gel prior to mixing of said gel with said fragments.

18. The method of claim 15, further comprising the step of mixing compost with said gel and fragments.

19. The method of claim 15, wherein said gel is at least one of agar, pectin, gelatin and collagen.

20. The method of claim 15, wherein said foam plastic is fragmented into fragments, which are between about 1 to 5 millimeters thick, about 1 to 5 millimeters wide, and 100 to 300 millimeters long.

21. The method of claim 15, wherein said foam plastic is a recycled expanded plastic.

22. The method of claim 15, further comprising mixing inorganic fibers with said coated fragments.

23. The method of claim 15, further comprising the step of forming said minerals by comprising exoskeletons of invertebrates.

24. The method of claim 15, wherein said minerals are mixed with said gel by mixing clay with said gel.

25. The method of claim 15, further comprising the step of forming said foam plastic, gel and minerals into a matrix, and disposing a top soil layer on said matrix.

26. The method of claim 25, wherein said top soil layer is made of organic materials.

27. The method of claim 18, further comprising the step of changing the pH of said artificial soil by controlling the relative amounts of compost and minerals added.

* * * * *